United States Patent [19]
Wollbeck et al.

[11] Patent Number: 4,480,683
[45] Date of Patent: Nov. 6, 1984

[54] ARRANGEMENT FOR HEAT AND MASS TRANSFER BY MEANS OF HOLLOW FIBERS

[75] Inventors: Rudi Wollbeck, Erlenbach; Thomas Zang, Goldbach, both of Fed. Rep. of Germany

[73] Assignee: Akzo NV, Arnhem, Netherlands

[21] Appl. No.: 289,512

[22] Filed: Aug. 3, 1981

[30] Foreign Application Priority Data

Aug. 28, 1980 [DE] Fed. Rep. of Germany ....... 3032417
Jul. 10, 1981 [DE] Fed. Rep. of Germany ....... 3127282

[51] Int. Cl.$^3$ ............................................. F28F 11/00
[52] U.S. Cl. ...................................... 165/70; 165/180
[58] Field of Search ............. 285/13, 14, 28, DIG. 19; 165/158, 180, 70, 71

[56] References Cited

U.S. PATENT DOCUMENTS

| | | | |
|---|---|---|---|
| 1,638,571 | 8/1927 | Gates | 285/14 |
| 1,780,837 | 11/1930 | Nott | 165/70 |
| 3,363,680 | 1/1968 | Baker | 165/180 |
| 3,526,275 | 9/1970 | Vance et al. | 165/158 |
| 3,966,235 | 6/1976 | Lewis | 285/28 |

Primary Examiner—William R. Cline
Assistant Examiner—Theophil W. Streule, Jr.
Attorney, Agent, or Firm—Michael J. Striker

[57] ABSTRACT

Arrangement for heat and/or mass transfer between a minimum of two liquids, effected by means of hollow fibers, the open ends of which are imbedded in a casting compound and which hollow fibers are located in the form of hollow fiber modules within a housing, wherein an intermediate ring and gaskets are provided between the housing and the casting compound beds of the hollow fiber module. A bore in the housing allows in case of a defective gasket that leaking liquid may drain to the outside, whereby short circuiting between the different liquid chambers of the housing will be prevented. The intermediate ring may be present as lose component or may, also, be fixedly connected to the face plates of the housing or the housing jacket. A plurality of hollow fiber modules may be arranged within a common housing. The hollow fiber module may be surrounded by a perforated supporting tube. The arrangement is particularly suitable for cross-flow filtration.

11 Claims, 10 Drawing Figures

ARRANGEMENT FOR HEAT AND MASS TRANSFER BY MEANS OF HOLLOW FIBERS

Arrangements for the heat and mass transfer by means of hollow fibers are finding an ever widening field of application in technology as well as medicine and other fields. Frequently, only one-time or short-time use is possible therein of the hollow fibers effecting such transfer. Wherever cleaning or regeneration of contaminated or exhausted hollow fibers is not possible, it becomes necessary to discard these and exchange them against unused ones. In many other instances, regeneration of the effect of the hollow fibers is possible only external to the arrangement per se, and in devices particularly designed therefor.

It will thus be understood that the desire existed to construct these exchange devices in such a manner that replacement could be performed also by untrained personnel and even by lay persons, and to have these exchange devices of simple construction also for reasons of economy, and also allowing their fabrication to be fast and simple. Since on one hand, the hollow fibers must not be damaged when replacing the exchange devices, and on the other hand the liquids being exchanged must be securely sealed against each other, it was usual to join the bundles of hollow fibers fixedly to the housing containing the required inlet and outlet openings for the respective liquids such joining being effected by bonding, welding, casting, etc. Upon exhaustion of the hollow fibers effecting the transfer, it was unavoidable with devices of the aforenoted type, that the housing which would still be usable per se, be discarded together with the hollow fibers.

It has therefore already been proposed to join the hollow fibers to the housing in a disconnectable manner, so that upon exhaustion of the hollow fibers only the hollow-fiber bundles per se need be replaced. A device of this type is, for instance, described in DT published application No. 2 400 020.

In the aforesaid arrangement, provision is made at the ends of the hollow-fiber module for gaskets serving to seal the chambers of one liquid against the chambers of the other liquid. It is of disadvantage in this known arrangement however, that upon installing, i.e. when pushing the hollow-fiber module into the housing, one of the two gaskets will be in sliding contact with the internal walls of the housing for nearly the entire length of the housing and may, in given instances be damaged thereby, particularly when the zone of the housing where the gasket is in sliding contact will, as is usual, also contain the inlet and outlet openings for one of the two liquids.

It is, furthermore, not possible in this known arrangement, readily to distinguish between a seepage caused by a defective hollow fiber and a seepage caused by a defective seal.

The present invention has, therefore, the object of making available an arrangement of the aforenoted category, wherein the gaskets will be safe to the greatest possible extent from being damaged during installation of the hollow-fiber bundle, wherein a flow, leaking out of one of the liquid chambers due to a defective seal, will not enter the chambers of the other liquid but will, instead, and for instance visible to the operating personnel, be drained away, such arrangement furthermore, allowing also untrained personnel to effect fast replacement of the hollow-fiber bundle only, as it is here in the form of a prefabricated module, and the gaskets herein allowing multiple reuse whilst the hollow-fiber bundle in particular is of simple construction and thus of fast and simple fabrication.

To attain this object, an arrangement of the aforenoted category is proposed, wherein provision is made as per invention, for an intermediate ring in the zone of the casting compound bed of the hollow-fiber ends, for a minimum of two external gaskets set at a distance to each other between internal ring and the peripheral surfaces of the casting compound bed, for a minimum of one bore disposed in essence radially through the intermediate ring and ending between the external gaskets and the internal gaskets, and for a minimum of one additional liquid-drain port arranged in the peripheral surface of the housing between the external gaskets.

Provision can be made at the internal surface area of the housing jacket of the arrangement as per invention or, respectively, at the external peripheral surface of the cast compound beds, for grooves of appropriate dimensions, said grooves serving to locate in place the gaskets or, respectively gasket rings, i.e. preventing lateral or axial displacement of the aforesaid gaskets or gasket rings during installation of the hollow-fiber module into the housing, and also during operation. The respective sealing surfaces on the intermediate rings may then be constructed as smooth surfaces.

It has proven as considerably more advantageous, to locate the grooves for holding the gaskets on the intermediate ring, since this will considerably simplify construction, and thus also fabrication of the hollow-fiber module which, in given instances, may be a disposable item.

Should the insertion of gaskets into the circular grooves cause the distance between the cast compound beds and the intermediate ring on one hand, and between intermediate ring and internal surface of the housing jacket on the other, to be reduced to such extent that perfect draining of leak flows is no longer ensured, it will be of advantage to provide for respective circular channels, closed in themselves, located on the intermediate ring both between the gaskets at its external side and the ring and between the gaskets at its internal side and the ring, these circular channels being in mutual communication by a minimum of one radial bore.

In modification of the present invention, proposition is therefore made for an arrangement wherein, as per invention, provision is made in the intermediate ring for circular grooves for holding the external and internal gaskets, and furthermore, between the external circular grooves, for an external circular channel, closed in itself and extending over the entire external perimeter of the intermediate ring, as well as, between the internal circular grooves, for an internal circular channel, closed in itself and extending over the entire internal periphery of the intermediate ring, both aforesaid circular channels being in mutual communication by a minimum of one aperture, with the external circular channel also being connected to the additional liquid drain port in the housing jacket.

In further modification of the invention, the intermediate ring may be fixedly connected to, and form an integral unit with, the housing jacket or the removable face plates of the arrangement as per invention, said face plates in turn being joined, liquid-tight, to the housing jacket and allowing the provision of connections for the liquids.

The smooth sealing faces arranged at both ends of the hollow-fiber module may be produced by appropriate preparation of the casting compound beds. It is, however, also practicable to provide the sealing faces at the external area of additional tubular sealing rings surrounding the casting compound beds, such additional sealing rings being joined, liquid-tight, to said casting compound beds, this provision being practicable in instances where the casting compound used for imbedding may prove inadequate to form a satisfactory seal.

If desired, the arrangement as per invention may also be modified to accommodate a plurality of hollow-fiber modules. In the instances of a plurality of modules arranged in parallel and within a common housing jacket, a plurality of intermediate rings may be joined to each other for this purpose and combined into a single sealing unit. It is also practicable for such a sealing unit made of a plurality of intermediate rings, to be fixedly joined to one respective removable face plate.

In the instance of hollow-fiber modules arranged sequentially within a common housing, it will be appropriate to join a plurality of housing jacket sections by means of correspondingly dimensioned intermediate pieces, it being of particular advantage herein to fixedly join the intermediate rings to the intermediate pieces, since such arrangement will considerably facilitate installation and removal of the modules. The intermediate pieces may be constructed herein in straight, curved, angled or U shape or in any other shape. The intermediate pieces may also be provided with connections for the liquids to be processed therein.

An embodiment has proved of particular advantage, wherein the intermediate pieces are constructed in the shape of a tubular 180° arc. This embodiment will, in fact, allow installing and removing the hollow-fiber modules by detaching these intermediate pieces without also having to remove the individual sections of the housing jacket, as is the case, for instance, with straight intermediate pieces and rigid connections between piping and housing jacket sections.

In principle, the housing jacket, the hollow-fiber bundle, the casting compound beds and the intermediate ring may be of any desired cross-sectional shape. It is obvious that for reasons of fabrication the circular shape is of course generally preferred since this will, inter alia, allow fast and facile fabrication of the respective components, for instance on the usual turning or grinding machines. However, if required due to other reasons, an oval or elliptical cross section may also be selected. Finally, also such cross sections are practicable as will result from rounding off the corners in a triangle, quadrangle or other polygonal structure. Such more or less pronounced rounding of corners is appropriate herein for obtaining a good seal. If desired, the aforenoted components may also be of different cross sections and be combined with each other, consideration having to be given therein that such shapes will cause nonconstant radial distances, f.i. between the casting compound beds and the housing jacket, and this must be compensated by appropriate dimensioning and shaping of the intermediate rings and/or gaskets.

Depending upon the application of the arrangement, and depending upon the requirements which the arrangement should meet, the housing may consist of any usual metallic or non-metallic material. Selection of the most suitable material for the intermediate ring as proposed, inter alia, by the invention, will also not be subject to any restrictions, provided, however, that consideration is given to all chemical, thermal and mechanical requirements. The same obtains for the gaskets, wherein it will be appropriate to use materials which are customary for these. It will also be practicable to use standard gaskets, provided that appropriate dimensions are selected for the intermediate ring and the grooves to hold the gaskets, as well as for the sealing faces located at the internal surface of the housing jacket at both ends of the housing.

For imbedding the hollow-fiber ends, use may be made of customary bonding agents, hardenable casting compounds, castable resins, special cements and the like. Fabrication of the hollow-fiber modules, as usable in the arrangement as per invention, is known. Use of said hollow-fiber modules herein is not restricted to any special types.

The term "hollow-fiber module" is to be understood in the sense of the present invention, to denote a bundle or pack of a random number of randomly long hollow fibers, hollow yarns or tubes of any desired shape, wherein at least the open ends of said fibers, yarns or tubes are imbedded in a material suitable for such purposes. The cross-sectional shapes of, respectively, the hollow-fiber bundle or pack, and of the bedding which in given instances can be flange-shaped, may be different as to their forms and dimensions, wherein, however, shape and dimensions of the bedding will, of course, on basis of the concept of the invention, have to be adapted to dimension and shape of the housing jacket of the arrangement which is to be used herein. The same obtains in an identical sense in respect of the length of the module. The hollow fibers from which the module is constructed may be of indentical or different lengths. The hollow fibers may, furthermore, be disposed in straight shape and essentially in parallel to each other, or, however, also in the shape of uniform and/or irregular loops and/or spatially extended coils and/or spirals, wherein the hollow fibers may be arranged in a plurality of layers also in such a manner that the hollow fibers of adjacent layers will, in given instances, be crossing each other repeatedly and/or contact each other at least at the points of crossing.

In order to protect the hollow fibers against damage during transportation, or respectively, removal or installation, and also to absorb in operation axial forces caused for instance by pressure differentials, it will be appropriate to provide for jacketing of the hollow-fiber module bundle, f.i. by a tube of coarse wire mesh or by a perforated tube. Such a supporting tube may also be located within the hollow-fiber module, as may also supporting elements in the shape of rods, helices or any other shape that may be provided internally and/or externally to the hollow-fiber module. It is important that the supporting elements are fixedly joined to the casting compound beds, f.i. cast into these. In hollow-fiber modules designed only for heat transfer, the hollow fibers may, for this or a different purpose, be imbedded for their entire length in a casting compound having good thermal conductivity.

The number of connections for supply and draining of the liquids used herein, will depend upon the respectively applied process, so that one connection or two, or a plurality of connections, may be provided for each liquid.

A further particular advantage of the arrangement as per invention may, inter alia, be seen in the fact that—differing from the state of the art—the sealing faces at the internal side of the housing jacket and also the sealing faces at the casting compound beds of the module may be of identical diameter, without the gaskets being damaged thereby during installation. This will allow fabrication of the arrangement as well as of the hollow-fiber module, to be faster and more simple, since it will thus be possible to have both these components of essentially symmetrical design.

The invention shall be explained in more detail with use of the drawing.

Shown in.

Figure 1:
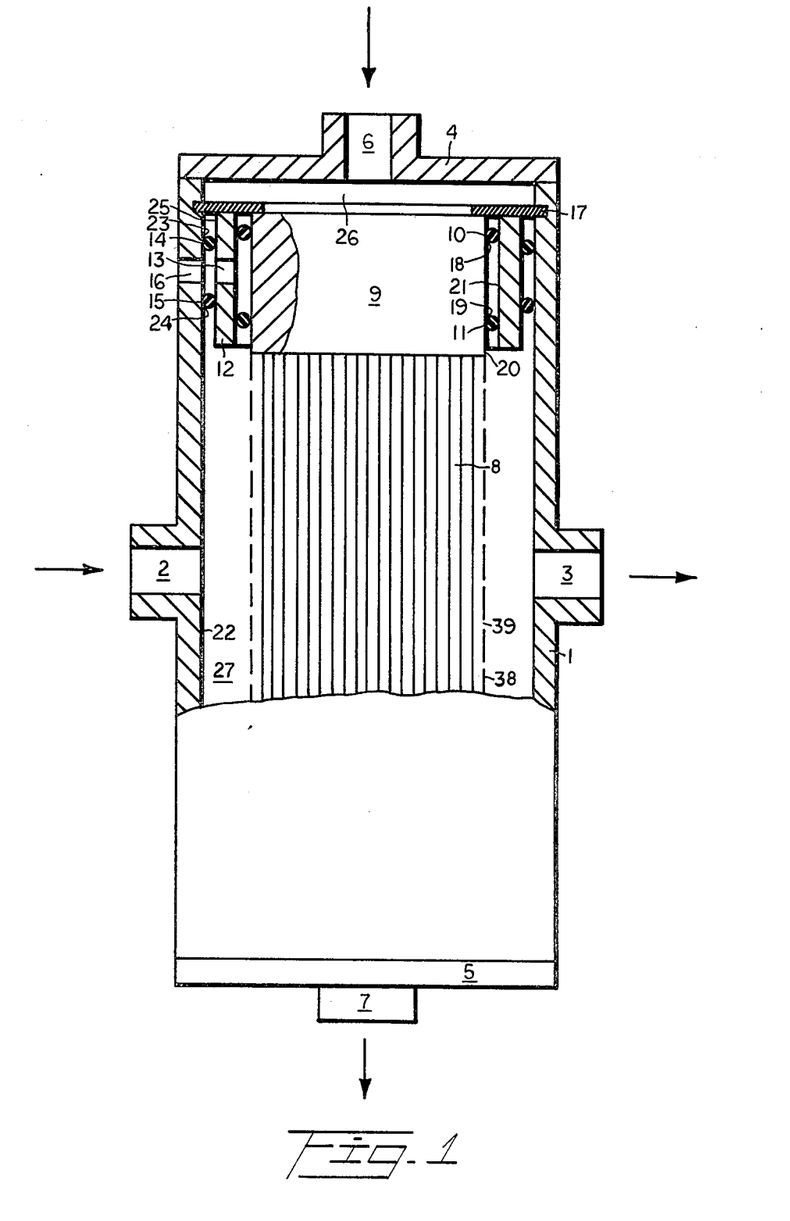
FIG. 1 in simplified schematic and partially longitudinal sectioned representation, and embodiment of the arrangement as per invention, wherein the intermediate ring is provided with smooth sealing faces, FIG. 2 in simplified schematic representation, a longitudinal section through a portion of an embodiment of the arrangement as per invention, wherein the intermediate ring is provided with grooves for the gaskets and with circular channels for draining of leakage flows, FIG. 3 in simplified schematic representation, a longitudinal section through a portion of an embodiment of the arrangement as per invention, wherein the intermediate ring is fixedly joined to the face plate, FIG. 4 in simplified schematic representation, a longitudinal section through a portion of an embodiment of the arrangement as per invention, wherein a minimum of two hollow-fiber modules are located within a common housing, FIG. 5 in simplified schematic representation a plurality of hollow-fiber modules in a sequential arrangement, FIGS. 6 to 8, different practicable cross-sectional shapes of the arrangement as per invention, FIGS. 9 to 10, a further modification of the arrangement as per invention, wherein the intermediate ring is fixedly joined to the housing jacket.

The following components of an embodiment of the arrangement as per invention are represented in FIG. 1: The housing, consisting of housing jacket 1 with liquid connections 2 and 3 as well as removable face plates 4 and 5 with liquid connections 6 and 7, the hollow-fiber module 8 with one of the two casting compound beds 9 for the hollow fiber ends, the internal gaskets 10 and 11, the intermediate ring 12 with the radially disposed bore 13, the external gaskets 14 and 15, the additional port 16 for liquid discharge provided within housing jacket 1, the locking ring 17, being, f.i. a commercially available circlip, and, furthermore, external to the hollow-fiber bundle and enclosing same, the supporting tube 38. The internal gaskets 10 and 11 are abutting, in a liquid-tight manner, the sealing faces 18 and, respectively, 19, provided at the external surface 20 of casting compound bed 9, and abutting also the internal surface 21 of intermediate ring 12, which surface is also constructed as sealing face. The external gaskets 14 and 15 are abutting, liquid-tight, the sealing faces 23 and, respectively, 24, provided at the internal surface 22 of the housing jacket 1, and are also abutting the external surface 25 of intermediate ring 12, said surface also being constructed as sealing face. The sealing faces 18; 19; 23 and 24 may, herein, be shaped as grooves. The bore 13, disposed radially through intermediate ring 12, issues into the external circular channel formed between the external gaskets 14 and 15 and also into the internal circular channel formed between the internal gaskets 10 and 11. The additional liquid-discharge aperture 16 provided in the housing jacket 1 is located between the external gaskets 14 and 15. It will be prevented in this manner that in case of one of the four gaskets 10; 11; 14; 15 not sealing tightly, liquid from chamber 26 could enter chamber 27 or vice versa, since such a leak flow will issue to the outside through the additional liquid drain port 16, and will be detected by the operating personnel or by suitable alarm devices. The essentially rigid supporting tube 38 is fixedly joined to the casting compound beds 9 and provided with the hollow-fiber module 8. For replacing hollow-fiber module 8, it is necessary to remove face plate 4 and locking ring 17, whereupon hollow-fiber module 8 and intermediate ring 12 with gaskets 10, 11; 14 and 15 may be pulled out of the housing.

Insertion of a new hollow-fiber module is then made in reverse order, and the gaskets may first be appropriately lubricated with suitable grease.

Figure 2:
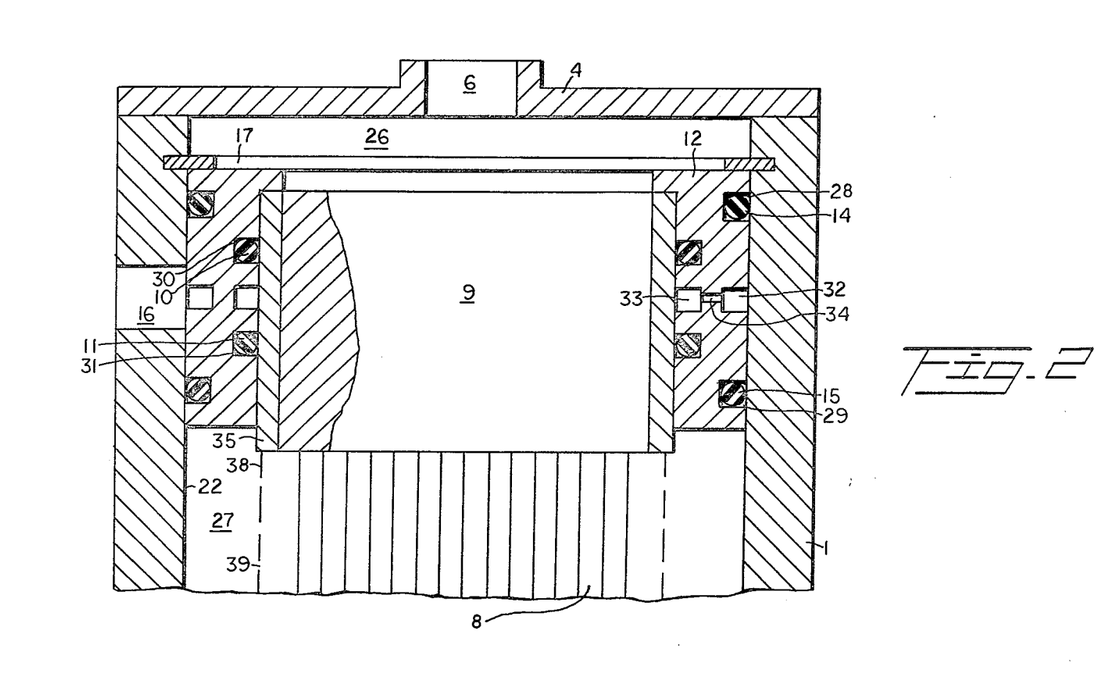

In the embodiment of the arrangement as per invention, shown in FIG. 2, all components corresponding to those shown in FIG. 1 are identified by the same numerals. Enumerating these components may thus be dispensed with. In this embodiment, the intermediate ring 12 is provided with two external circular grooves 28 and 29 for holding the external gaskets 14 and, respectively 15 and extending over the external periphery of intermediate ring 12, said intermediate ring 12 furthermore also being provided with two circular grooves 30 and 31 for holding the internal gaskets 10 and, respectively 11, these grooves 30 and 31 extending along the internal circumference of intermediate ring 12. The intermediate ring 12, shown in FIG. 2 is, furthermore, provided with an external circular channel 32, closed in itself and extending along the outer perimeter of intermediate ring 12, and also with an internal circular channel 33, closed in itself and extending along the internal perimeter of intermediate ring 12, both circular channels being in mutual communication through aperture 34. The external circular channel 32 is located between the external gaskets 14 and 15, the internal circular channel between the internal gaskets 10 and 11. The additional liquid-discharge port 16 is in communication with the external circular channel 32, so that a leak flow, issuing through gaskets 10; 11; 14 or 15 may pass to the exterior. In this embodiment shown in FIG. 2, the casting compound bed 9 is surrounded by a tubular sealing ring 35, made from a different material and fixedly, i.e. liquid-tight, connected to bedding 9. Such an embodiment may be selected when the material used for imbedding the hollow-fiber ends is not, or only inadequately, suitable for forming of sealing faces. Installation and removal of the hollow-fiber module 8 is effected in this embodiment in the manner as described for the embodiment shown in FIG. 1.

Figure 3:
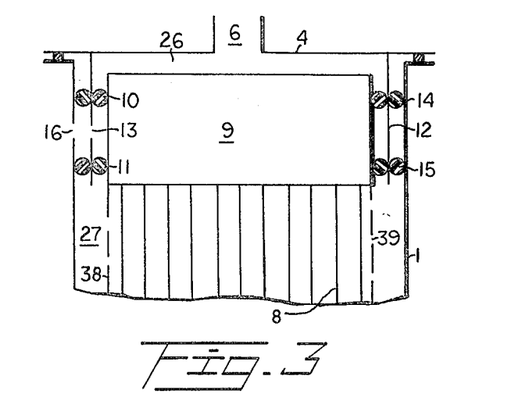

FIG. 3 shows an embodiment of the arrangement as per invention, wherein intermediate ring 12 is fixedly joined to face plate 4, thus forming a unit with it. The intermediate ring may also be fixedly joined into a unit with the face plate at the opposite side of the arrangement, not shown herein. It is also practicable to combine the embodiments shown in FIGS. 1 and 2 with the embodiment of the intermediate rings as described afore. It will be of particular advantage with the embodiment of the intermediate ring depicted in FIG. 3 if the ring—as shown in FIG. 2—is provided with circular grooves 28; 29; 30; 31 for holding, respectively, the external and internal gaskets 10; 11; 14; 15 and also provided with the internal circular channel 33 and the external circular channel 32.

All other components of the embodiment of the arrangement as per invention shown in FIG. 3 correspond with their identifying numerals to the components shown in, respectively, FIG. 1 or FIG. 2.

Figure 4:
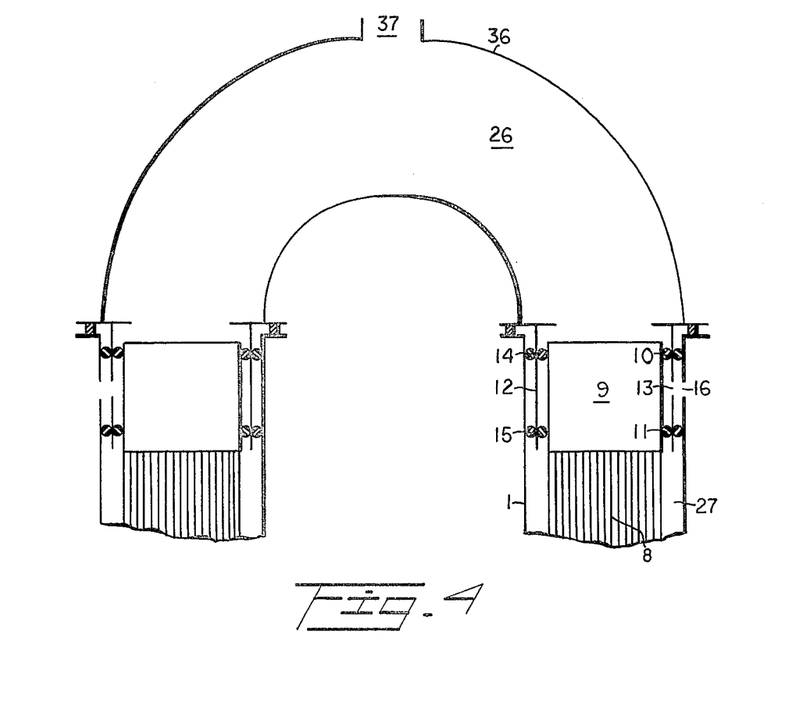

FIG. 4 depicts an embodiment of the arrangement as per invention which will allow to arrange two, or a plurality of, hollow-fiber modules 8 within a common housing. To accomplish this, it will be practicable to join by means of a connector 36 each housing jacket section 1 containing a hollow-fiber module 8 with a subsequent housing jacket section 1. This connector 36 is shown in FIG. 4 in the shape of a 180° arc, but it may, as required, also be constructed as a straight piece, elbow or arc. Irrespective of the construction of the connector 36 as may be best suited in a particular case, it will be particularly favorable to fixedly join intermediate rings 12 and connector 36 into a unit, as depicted in FIG. 4. To facilitate assembly of such an embodiment, an embodiment of the intermediate ring 12 will appropriately be selected as is shown in FIG. 2. The embodiment of the arrangement as per invention, partially shown in FIG. 4, will be particularly suitable when a plurality of hollow-fiber modules 8 is arranged in sequence. Provision of, respectively, liquid inlet or drain port 37 within connector 36 will allow dividing the flow of the liquid and thus enable operation of one or a plurality of hollow fiber modules in parallel. All other components of the embodiment shown in FIG. 4 correspond with their numerals to the components shown in FIGS. 1 to 3. In order to improve legibility, numerals have been shown in FIG. 4 only for the components in the right-hand half of this Figure. Identification of components in the left-hand half of said FIG. 4 is however simple, as these are shown in mirror image to the respective components on the right-hand half of that Figure.

Figure 5:
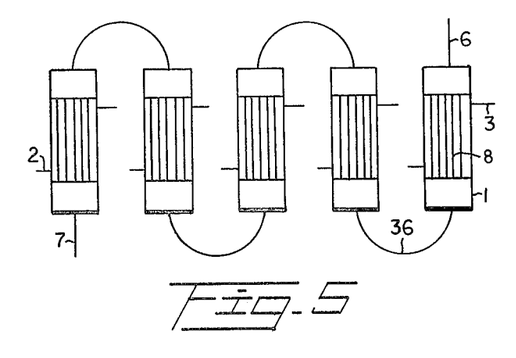

In the embodiment shown in FIG. 5, five hollow-fiber modules 8 are set within a common housing, wherein the individual housing jackets 1, each surrounding one respective hollow-fiber module 8, are joined by connectors 36 as shown in FIG. 4, said connectors having the shape of a 180° arc. The liquid connections 2; 3; 6 and 7 are also indicated.

Figure 6:
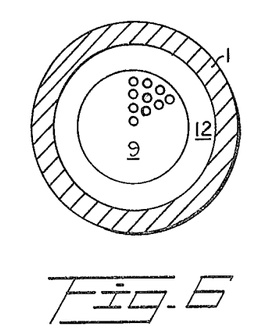

In the embodiment shown in cross section in FIG. 6, the housing jacket 1, intermediate ring 12 and casting compound beds 9 are of circular cross section.

Figure 7:
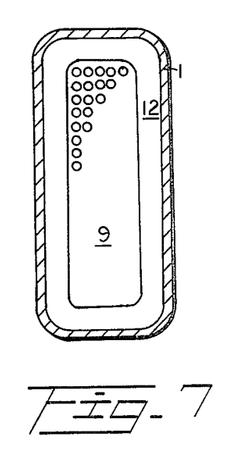

In the embodiment shown in FIG. 7, housing jacket 1, intermediate ring 12 and casting compound beds 9 are of a cross section as will result when the corners of a rectangle are rounded off.

Figure 8:
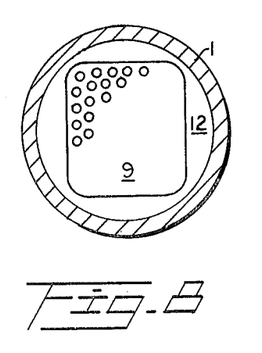

In the embodiment shown in FIG. 8, housing jacket 1 is of circular cross section and casting compound bed 9 is of a cross section as will result when the corners of a square are rounded off. The intermediate ring 12 is of such dimensions and shape that it will occupy the space within housing jacket 1 and each of the casting compound beds 9, albeit with some play, but in essence fully.

For reasons of simplicity, gaskets 10; 11; 14 and 15 are not shown in FIGS. 5 to 8, nor are other components which are contained in the preceding Figures. The invention is, moreover, not restricted to the cross-sectional shapes shown in FIGS. 6 to 8.

It has furthermore proved that it will not always be necessary to construct the intermediate ring as proposed by the invention as a, respectively, lose or detachable component of the arrangement as per invention, since it is frequently practicable—and may even be of advantage—that the intermediate ring provided at each end of the housing be connected to the housing jacket in a fixed and liquid-tight manner. Such a connection between intermediate ring and housing jacket may be effected, for instance, by welding, soldering, bonding, cementing, etc. With such an embodiment of the arrangement as per invention, the otherwise required gaskets between each intermediate ring and the housing jacket may be dispensed with. It will, however, continue to be practicable also herein, to use intermediate rings fabricated from a material other than that of the housing jacket.

Furthermore, the intermediate ring may, also in this embodiment, incorporate the same features as the lose, or, respectively, detachable intermediate ring already described before.

In a further modification, the intermediate rings as proposed by the invention may form a unit with the housing unit. In a particularly preferred variant of this embodiment of the arrangement as per invention, the housing jacket is constructed from a tubular center section having liquid connections and provided at each end of the tubular center section, said end pieces being connected to the center section in a liquid-tight manner, for instance by welding, soldering, bolting or bonding, wherein the intermediate ring at each end of the housing jacket and the corresponding end piece are fabricated from one piece, thus forming a unit.

In the description of FIGS. 1 and 2, locking rings 17, commercially available as circlips, were proposed as a means for axially fixing the hollow fiber module within the housing jacket of the arrangement as per invention. It is, however, also practicable to provide for the same purposes worm screws, threaded into the housing from outside and protruding into the interior of the housing. The number of such worm screws should be a minimum of three at each end, the worm screws should, as far as possible, be located at a uniform spacing about the circumference. If suitable indentations are provided at appropriate loci in the hollow-fiber module to be fixed, so that the tips of the worm screws can protrude into these indentations, very good axial fixing of the hollow-fiber module within the housing will also be achieved. The worm screws may, however, also be so located that their axial distance will be of a slightly larger dimension than the length of the hollow-fiber module to be fixed.

Figure 9:
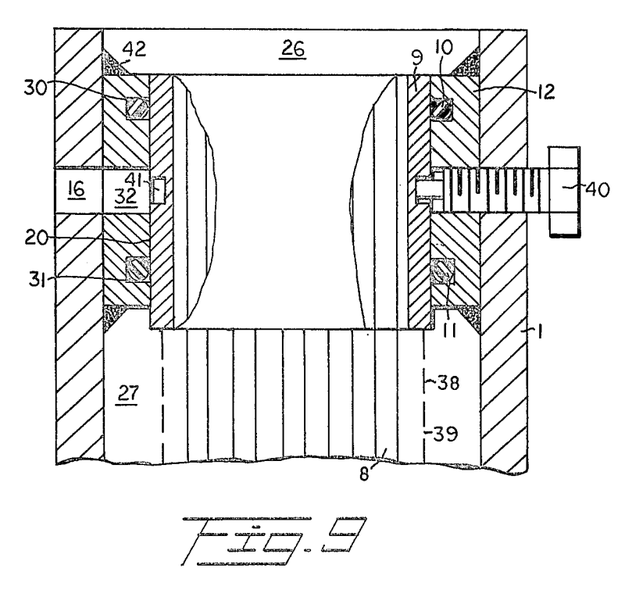
Figure 10:
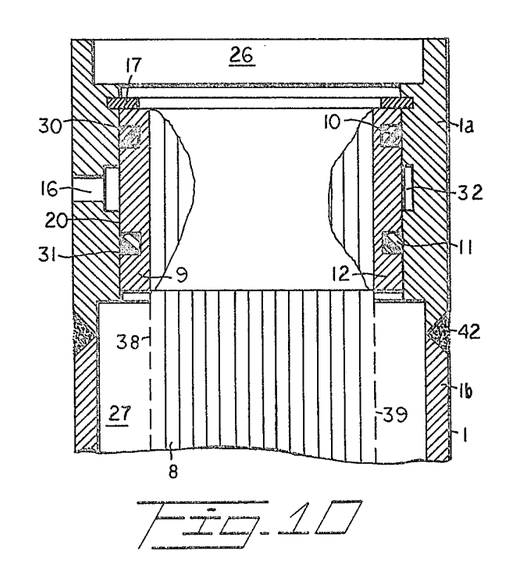

FIGS. 9 and 10 show in a simplified schematic representation a longitudinal cross section through the arrangement as per invention, wherein the intermediate ring 12 is fixedly and liquid-tight connected to housing jacket 1, for instance by means of welding seams 42. For reasons of simplification, only the respective upper portion of the arrangement as per invention is shown in each Figure, since the lower part may in general be constructed in an analogous manner, i.e. as mirror image. The following components are, furthermore, shown in FIG. 9: The hollow-fiber module 8 located within the housing jacket 1 with one of the two casting compound beds 9 for the hollow fiber ends, the internal gaskets 10 and 11, the additional liquid drain port 16 for detecting possibly occurring leak flows arranged within housing jacket 1, the supporting tube 38 with liquid passages 39, said tube being arranged external to the hollow-fiber bundle of hollow-fiber module 8 and surrounding the module, the circumferential circular channel 32 which is closed in itself, the circular grooves 30 and 31 for holding the internal gaskets 10 and, respectively, 11, said circular grooves extending about the internal perimeter of intermediate ring 12 and said internal gaskets 10 and 11 abutting liquid-tight the external surface of casting compound bed 9, one of the worm screws 40 for axially fixing the hollow-fiber module 8 within housing jacket 1 and also two of the indentations 41 into which the tips of worm screws 40 will protrude. When dimensioning the worm screws 40, attention must be paid that circular channel 32 will not be fully occupied at the respective loci by worm screws 40, in order to allow leaking liquid that may possibly enter circular channel 32 to flow with certainty to drain port 16. Not shown in either Figure are the removable plates for closing the housing and also not the connections for supply and draining of the liquids. For simplification, it is practicable to provide instead of a requisite number of indentations 41 a circular groove about the external surface 20 of casting compound bed 9, with the tips of worm screws 40 protruding into said circular groove. It is important to have the circular channel 32 located between gaskets 10 and 11 so that in case of leakage at one of the two gaskets 10; 11 a short circuit between the two liquid chambers 26 and 27 will be avoided with certainty. The essentially rigid supporting tube 38 is fixedly connected to the casting compound beds. For replacing hollow-fiber module 8, the face plates, not shown herein, and worm screws 40 are removed, whereupon hollow-fiber module 8 may be pulled out of the housing, whilst gaskets rings 10 and 11 will remain in the intermediate ring 12. In case replacing of the gaskets becomes necessary, this may be done in a simple manner after hollow-fiber module 8 has been pulled out. Insertion of a new hollow-fiber module is then made in reverse order, i.e. worm screws 40 are threaded in again after insertion of the hollow fiber module and the face plates for closing the housing, not shown herein, are also attached again.

In the embodiment of the arrangement as per invention, shown in FIG. 10, intermediate ring 12 and end piece 1a of housing jacket 1 are made from one piece, and the end piece 1a is connected by welding seam 42 to center section 1b of housing jacket 1 fixedly and fluid-tight toward the exterior. Otherwise, all components corresponding to components shown in FIG. 9, bear the same numerals. Enumeration and description of same may thus be dispensed with. Differing from the embodiment shown in FIG. 9, axial fixing of hollow-fiber module 8 is effected in the embodiment shown in FIG. 10 by means of a locking ring 17, for instance a commercially available circlip. This locking ring 17 is set within a groove, especially provided for this purpose at the inner perimeter of intermediate ring 12. In this embodiment, the gasket rings 10 and 11 are set in circular grooves provided in the external surface 20 of casting compound bed 9. The intermediate ring 12 is therefore of smooth construction on its internal surface. In this embodiment, replacing the hollow-fiber module 8 is effected by removing the face plates, not shown herein, and the locking ring 17, whereupon hollow-fiber module 8 may be pulled out of the housing together with gaskets 10 and 11. Inserting of a new hollow-fiber module is again accomplished in reverse order, wherein gaskets 10 and 11 may suitably be lubricated beforehand with an appropriate grease.

Should axial expansion of hollow-fiber module 8 be desired, it is readily possible to provide axial fixing of the module either by means of a locking ring 17, worm screws 40 or any other suitable means known per se and only at one side of hollow-fiber module 8 and to allow for free expansion at the other side thereof.

In order to prevent damage to gaskets 10; 11 upon hollow-fiber module 8 being pushed into housing jacket 1, it will generally be of advantage to locate circular channel 32 and gaskets 10 and 11 on one side, i.e. either at the external surface 20 of casting compound beds 9 or at the internal surface of intermediate ring 12 and to have the respective other surface, i.e. the area opposite to the aforenoted area, of smooth construction.

I claim:

1. Arrangement for heat and/or mass transfer from a minimum of one first liquid to a minimum of one second liquid by means of hollow fibers from spinnable synthetic polymers, comprising a housing having an internal surface, connections on said housing for supply and draining of the liquids, said housing defining a minimum of one additional liquid drain port, a hollow fiber module removably connected to said housing, said hollow fiber module containing open hollow fibers ends embedded in a casting compound bed having an external surface, said casting compound bed is interconnected by a minimum of one essentially rigid supporting element, an intermediate ring defining a minimum of one bore of essentially radial disposition, said intermediate ring is located between said casting compound bed of said hollow fiber ends and said housing, a minimum of two external gaskets arranged at a distance to each other between said intermediate ring and said internal surface of said housing, a minimum of two internal gaskets arranged at a distance to each other between said intermediate ring and said external surface of said casting compound bed, whereby said intermediate ring, said external gaskets and said internal gaskets define between said housing and said hollow fiber module a distributing chamber and a collecting chamber for said liquids, said minimum of one bore of essentially radial disposition of said intermediate ring ends between said external gaskets and said internal gaskets, said minimum of one additional liquid drain port arranged in said housing between said external gaskets.

2. Arrangement according to claim 1, wherein said housing and said casting compound bed of said hollow fiber ends have non-angular cross-sections.

3. Arrangement according to claim 1, wherein said intermediate ring defines circular grooves for holding said external gasket and said internal gaskets, said intermediate ring also defines an external circular channel closed in itself and extending between said circular grooves for said external gaskets, said external circular channel extending over the entire periphery of said intermediate ring, said intermediate ring defines an internal circular channel closed in itself and extending between said circular grooves for said internal gaskets, said internal circular channel extending over the entire internal perimeter of said intermediate ring, said intermediate ring defining a minimum of one aperture in communication with both said external circular channel and said internal circular channel, said external circular channel further being connected to said additional liquid drain port of said housing.

4. Arrangement according to claim 1, further comprising a tubular sealing ring surrounding said casting compound bed of said hollow fiber ends, said tubular sealing ring is connected liquid-tight to said casting compound bed and is made of a different material therefrom, said internal gaskets are arranged between said intermediate ring and said tubular sealing ring, whereby said internal gaskets are arranged between said intermediate ring and said external surface of said casting compound bed.

5. Arrangement according to claim 1, wherein said rigid supporting element comprises a perforated tube arranged within said hollow-fiber bundle.

6. Arrangement according to claim 1, wherein said rigid supporting element is a perforated tube arranged outside said hollow-fiber bundle.

7. Arrangement according to claim 1, wherein said rigid supporting element is a tubular mesh arranged within said hollow-fiber bundle.

8. Arrangement according to claim 1, wherein said rigid supporting element is a tubular mesh arranged outside said hollow-fiber bundle.

9. Arrangement as per claim 1, characterized by the intermediate ring being fixedly connected to face plate.

10. Arrangement as per claim 1, characterized by a minimum of two hollow-fiber modules being located within a common housing, wherein the individual parts of housing jacket are joined by a minimum of one connector, and by the intermediate rings being fixedly connected to, respectively, the intermediate piece (36).

11. Arrangement as per claim 10, characterized by the connector being constructed in the shape of a 180° arc.

* * * * *